United States Patent [19]

Caron et al.

[11] Patent Number: 4,783,182

[45] Date of Patent: Nov. 8, 1988

[54] ROLLING BEARING WITH TWO ROWS OF ROLLING ELEMENTS AND EQUIPPED WITH A RETENTION PIECE FOR THE BEARING RINGS, RETENTION PIECE USABLE FOR THIS PURPOSE AND PROCESS FOR ASSEMBLING SUCH A BEARING

[75] Inventors: Fabrice Caron, Montigny le Bretonneux; Herve Le Quinio, Paris, both of France

[73] Assignee: SKF France, Clamart, France

[21] Appl. No.: 35,840

[22] Filed: Apr. 8, 1987

[30] Foreign Application Priority Data

Apr. 14, 1986 [FR] France .................. 86 05309

[51] Int. Cl.$^4$ ............................................. F16C 33/38
[52] U.S. Cl. ........................................ 384/504; 384/510;
384/512; 384/523; 384/531; 384/539
[58] Field of Search ............... 384/504, 506, 510, 512,
384/526, 527, 531, 536, 539, 576, 585, 551, 523

[56] References Cited

U.S. PATENT DOCUMENTS

| | | | |
|---|---|---|---|
| 1,379,945 | 5/1921 | Teetsow | 384/506 |
| 1,464,316 | 8/1923 | Gillespie | 384/506 |
| 2,075,280 | 3/1937 | Green | 384/504 |
| 4,398,775 | 8/1983 | Hofmann et al. | 384/527 |

Primary Examiner—Lenard A. Footland
Attorney, Agent, or Firm—Beveridge, DeGrandi & Weilacher

[57] ABSTRACT

A roller bearing assembly with two rows of rolling elements includes a first ring formed in one piece to have two raceways and two independent rings each having one raceway, a device for maintaining the relative positions of the rolling elements between the rings and a device for fixing the two independent rings axially to one another. The relative positions of at least some of the rolling elements are maintained by two parts of a retention device which includes, before the bearing is assembled, one or more connecting zones in a relatively weakened condition so that they will break during assembly of the rolling bearing assembly.

23 Claims, 15 Drawing Sheets

4,783,182

ROLLING BEARING WITH TWO ROWS OF ROLLING ELEMENTS AND EQUIPPED WITH A RETENTION PIECE FOR THE BEARING RINGS, RETENTION PIECE USABLE FOR THIS PURPOSE AND PROCESS FOR ASSEMBLING SUCH A BEARING

BACKGROUND OF THE INVENTION

The subject of the present invention is a rolling bearing with two rows of rolling elements, of the type comprising a first ring formed in one piece and having two raceways and a set of two independent rings, each having one raceway.

One of the problems to be solved in rolling bearings of this type is to connect or fix together the two independent rings axially during the operations of handling, transporting, assembling and, if appropriate, dismantling the rolling bearing in the mechanical assembly in which it is incorporated when it is operating normally.

Such means of fixing the independent rings of bearings axially together have already been provided. Thus, for example, in French Pat. No. 2,439,902 a plsatic bush fitted into the bore in the two independent rings, here forming the inner rings, is used. This makes the connection between the two inner independent rings during the handling and transport operations, up to the moment when the rolling bearing is mounted in the mechanical assembly with which it is to interact. However, the disadvantage of such a means of axial fixing is that this plastic bush has to be ejected before the inner rings are fitted onto the shaft. When the plastic bush is removed in this way, the inner rings are no longer retained and then risk coming apart, with all the risks which that entails (tangling, damage, pollution, the risk of loss of the rolling elements). The same disadvantages arise if the rolling bearing is dismantled outside its receptacle.

Moreover, if such an axial fixing bush fitted in the bore of the inner rings is left in position, this results in inadmissible marking and damage of the shaft. The same can be said regarding, for example, the use of a bush which grips the two independent inner rings in French Pat. No. 2,078,551. The crimping of a metal bush is a solution which is complicated to put into practice. Moreover, it gives rise to a poor-quality bearing surface on the shaft.

Another solution involving crimping a metal collar or stud on the outer surface of two independent outer rings is described in French Pat. No. 2,104,411. Although the connection made in this way is relatively effective, it is nevertheless still difficult and costly to carry out.

French Pat. No. 2,439,902 already mentioned also envisages using, as means for the axial retention of the two independent inner rings, elastic collars or flanges fixed axially to the outer ring. The axial connection between the independent inner rings is made as a result of the interaction of these attached elements with the rolling elements and by means of suitable steps fashioned in the inner rings. Quite apart from the complexity of such means, it can be seen that it is inadvisable to transmit forces via the interior of rolling elements which do not rotate before assembly, since that presents considerable risk of damage, particularly if the rolling elements come in contact with the flanges, retaining rings or elastic collars which ensure that the two independent rings are fixed axially to one another.

French Pat. No. 2,489,905 also makes known a device for fixing two independent inner rings to one another by means of an elastic collar which snaps into grooves provided for this purpose in the two independent inner rings. However, this solution makes use of an attached accessory which has to be produced separately and the fitting of which requires relatively complex special precautions and operations.

Finally, French Pat. No. 2,492,919 describes a means of fixing together axially two independent inner rings of a ball bearing with two rows of balls by means of tongues integral with the bearing box, these tongues interacting with grooves specially made in the two independent rings. Despite the apparent advantages of such a means which does not have an additional piece separate from the box, such a device nevertheless presents inadmissible risks, particularly the risk of friction of the retention tongues of the box on the walls of the snap-in grooves of the two independent rings during the operation of the bearing.

SUMMARY OF THE INVENTION

The subject of the present invention is a rolling bearing of this type, in which the means making it possible to fix the two independent rings axially to one another are simple to produce and completely devoid of any risk of interference with the operation of the rolling bearing after it has been mounted in the assembly, within which it is incorporated.

The subject of the present invention is also such a rolling bearing, in which the means of fixing the two independent rings axially to one another do not include any additional separate piece at the production stage.

The present invention likewise relates to a single retention piece capable of ensuring both that the two independent rings are fixed axially to one another and that the relative positions of the rolling elements between the two rings are maintained, as with a box or cage of the conventional type.

Finally, the present invention further relates to a process for assembling such a bearing making use of such a retention piece.

The rolling bearing with two rows of rolling elements according to the invention is of the type comprising a first ring formed in one piece and having two raceways and a set of two independent rings, each having one raceway. The bearing also has means of maintaining the relative positions of the rolling elements between the two rings and means of fixing the two independent rings axially to one another. According to the invention, the two independent rings are fixed axially to one another and the relative positions of at least some of the rolling elements of the bearing are maintained by means of two parts of a retention piece having, before the bearing is assembled, one or more connecting zones weakened so that they break when the bearing is assembled.

The weakened connecting zones are preferably arranged in such a way that the axial position of the two parts of the retention piece is different before and after assembly, in order to cause the said connecting zones to break automatically when the bearing is assembled.

The part of the retention piece ensuring that the two independent rings are fixed axially to one another preferably comprises a bush or connector element equipped with radially directed hooks which are designed to interact with at least one groove made in the bore of one of the independent rings of the bearing.

The connector element advantageously has axial stop surfaces designed to interact with a corresponding surface of one of the independent rings, in order to cause the connecting zones to break when the bearing is assembled.

In this way, it is possible to produce the retention piece, for example, from moulded plastic suitably reinforced by means of appropriate fillers, exactly in the same way as a cage of conventional type. The rolling elements are maintained in place by that part of the retention piece which forms a cage, while the two independent rings are fixed axially to one another automatically, at the moment when the unit as a whole is assembled, as a result of the breakage of the weakened connecting zones, the connector element then separating from the part of the retention piece forming a box.

There are various possible embodiments of such a retention piece.

According to an advantageous embodiment, the part of the retention piece which ensures that the two independent rings are fixed axially to one another comprises a connector element equipped with two rows of hooks, each row being designed to interact with a groove made in one of the said independent rings. The part of the retention piece which ensures that the rolling elements are maintained in place can then preferably comprise a cage provided with staggered cells or pockets for receiving the rolling elements of the two rows of rolling elements.

The weakened connecting zones are preferably formed by at least three radially connecting studs having a zone of reduced thickness. The connecting studs are integral with the connector element in a radial plane of symmetry of the bearing and integral with the cage in a position offset relative to the radial plane of symmetry of the bearing. Thus, when the rolling bearing as a whole is assembled, the connecting studs are consequently broken.

In another equally advantageous embodiment, the part of the retention piece which ensures that the rolling elements are maintained in place comprises a first cage provided with pockets for receiving the rolling elements of one of the rows of rolling elements. The rolling elements of the other row are retained by a separate cage of conventional type.

According to another particular expedient embodiment, the two independent rings are fixed axially to one another by means of two retention pieces symmetrical relative to the radial plane of symmetry of the bearing. Each retention piece comprises a cage provided with pockets designed for receiving the rolling elements of one of the rows of rolling elements, and a connector element equipped with a row of hooks designed to interact with a groove made in the independent ring having the raceway for the rolling elements retained in the box.

The hooks are preferably arranged at the end of equidistant axial tongues separated by matching recesses, so that the two retention pieces can fit into one another.

In this embodiment, the hooks of each retention piece also preferably have a sloping surface designed to interact with a matching sloping surface of the bottom of the recesses of the other retention piece, in order, after assembly, to reinforce the action of the hooks because the shapes of the two matching sloping surfaces complement one another.

In this embodiment, it will be seen that the two retention pieces used are perfectly symmetrical, so that it is possible to produce them by means of a single mould.

The invention can be used when the two independent rings form the inner ring or the outer ring of the bearing. It can be applied to any type of rolling bearing, especially angular-contact ball bearings, cylindrical or tapered roller bearings, etc.

The subject of the invention is also a retention piece produced from moulded plastic and having a part in the form of a cylindrical cage provided with pockets capable of receiving rolling elements of a rolling bearing with two rows of rolling elements, of the type comprising a first ring formed in one piece and a set of two independent rings. The piece has, moulded integrally with it, a connector element concentric relative to the cage and connected to the latter by means of one or more connecting zones weakened so that they break when the bearing is assembled.

The connector element preferably has a plurality of radially directed hooks.

In an advantageous embodiment, the connector element is connected to the box by means of at least three radially connecting studs having a zone or reduced thickness. The connecting studs are integral with the connector element in a radial plane of symmetry of the connector element and integral with the cage in a position offset relative to the radial plane of symmetry of the cage.

A rolling bearing with two rows of rolling elements, having a retention peice according to the invention, is assembled in the following way:
the rolling elements are introduced into the part of the retention piece forming a cage,
the assembly as a whole is placed on the raceways of the ring formed in one piece,
the two independent rings are introduced axially, until they come up against the edges of the bush-shaped part of the retention piece,
an axial push is exerted on the independent rings, until a row of hooks of the connector element penetrates into the groove of one of the independent rings and comes up against the independent ring,
the axial pushing action on the independent rings is continued until the weakened connecting zones of the retention piece break and the other row of hooks penetrates into the groove of the other independent ring.

Where a rolling bearing having a retention piece in two symmetrical parts is concerned, assembly takes place in the following way:
the rolling elements are introduced into the part of each retention piece forming a cage,
the assembly as a whole is placed on the raceways of the ring formed in one piece,
the two independent rings are introduced axially, until they come up against the edges of the bush-shaped part of each retention piece, and moreover, at the same time, the parts of the two retention pieces forming a cage come up against one another,
an axial push is exerted on the independent rings, until the weakened connecting zones of one of the retention pieces breaks and the hooks of this retention piece penetrate into the groove of one of the independent rings,
the axial pushing action on the independent rings is continued until the weakened connecting zones of the other retention piece break and the hooks of this other retention piece penetrate into the groove of the other independent ring.

BRIEF DESCRIPTION OF THE DRAWINGS

The invention will be understood better from a study of some embodiments described by way of non-limiting example and illustrated in the accompanying drawings, in which:

FIGS. 20 to 26 illustrate the various steps in the assembly of the rolling bearing of FIG. 18.

DETAILED DESCRIPTION OF THE PREFERRED EMBODIMENTS

Figure 1:
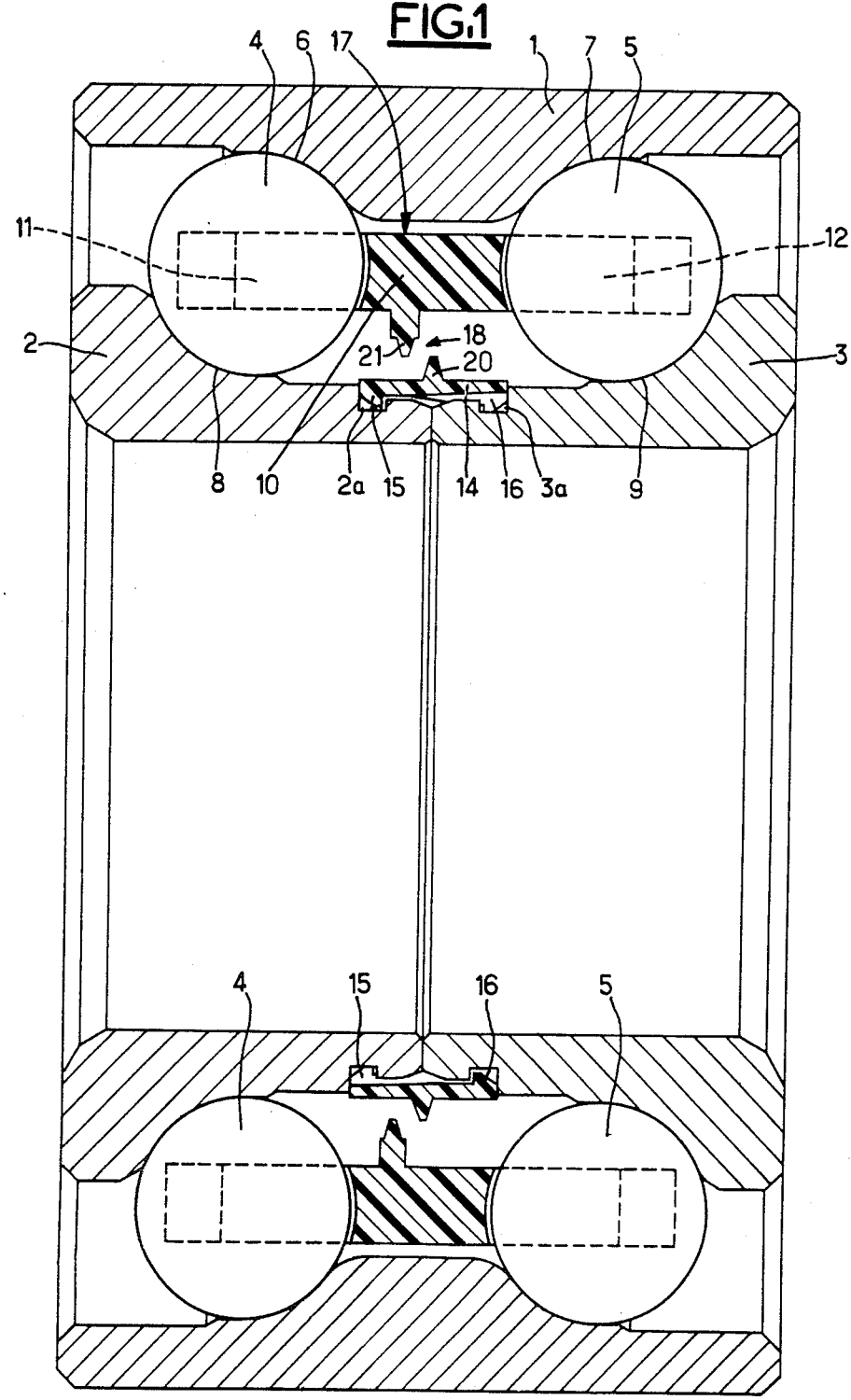
FIG. 1 is a sectional view of a rolling bearing according to the invention, after assembly and after the connecting studs of the retention piece have broken.

As illustrated in FIG. 1, the bearing with two rows of annular-contact balls according to the invention comprises an outer ring 1 and two independent inner rings 2 and 3. Two rows of balls designated 4 and 5 respectively are inserted between the inner ring 1 and the outer rings 2, 3 and can roll in the usual way on the raceways 6 and 7 made in the bore of the outer ring 1 and on each of the raceways 8 and 9 made on the outer cylindrical surface of the two independent inner rings 2 and 3 respectively.

The relative positions of the balls 4 and 5 are ensured by a box or cage 10 of general cylindrical shape. The cage 10, which can be seen in the laid-out view of FIG. 2, has on its periphery, on each side of its radial plane of symmetry, a plurality of cells or pockets 11 and 12 that open outwardly to receive a ball 4 or 5. The pockets 11 and 12 are delimited by elastic branches 13 which follow the contour of the balls 4, 5 and which allow the latter to snap elastically into the pockets.

Figure 2:
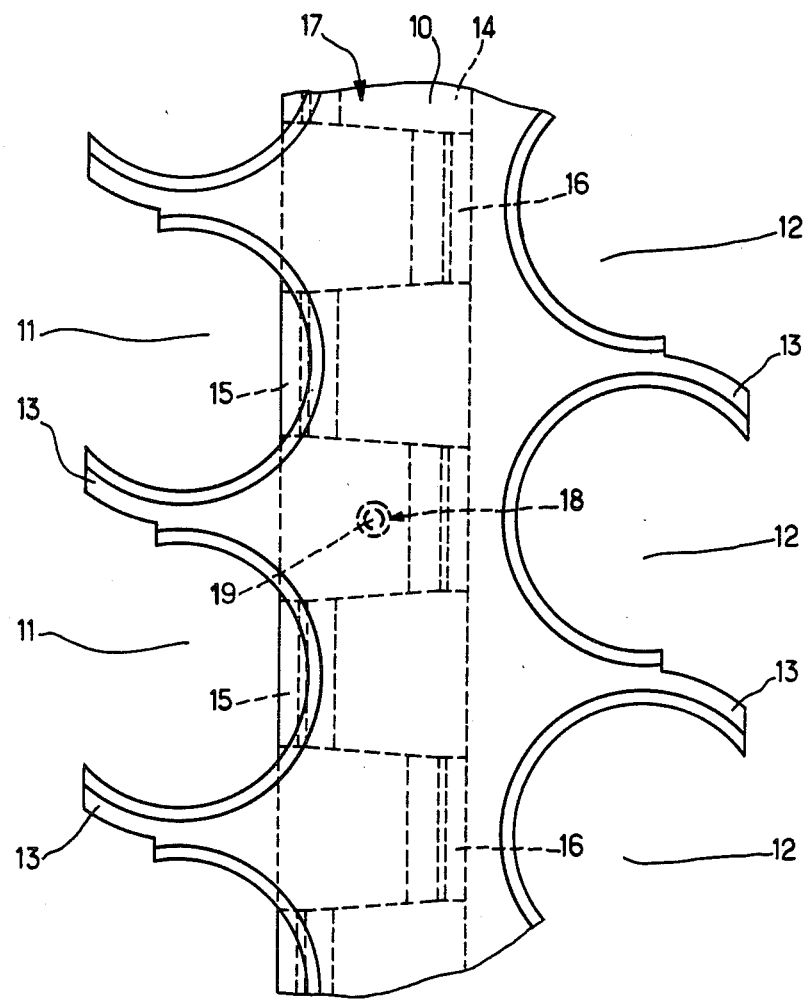
FIG. 2 is a partial laid-out view of a retention piece according to the invention.
Figure 3:
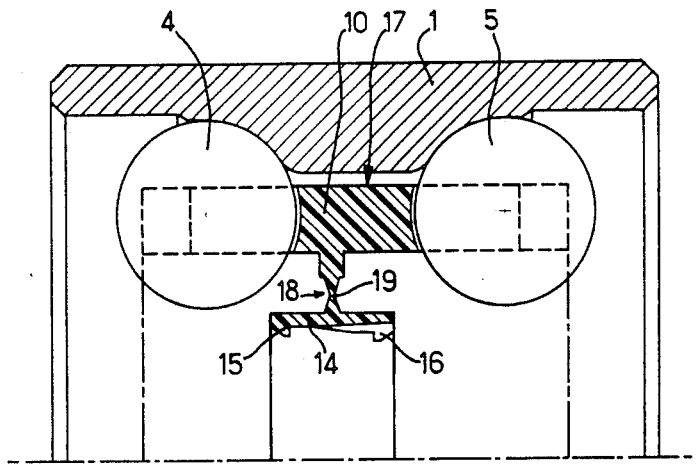
FIGS. 3 to 7 illustrate the various steps in the assembly of the rolling bearing of FIG. 1.

The two independent inner rings 2, 3 are fixed axially to one another by means of a bush or connector element 14 which has two rows of hooks 15, 16 arranged staggered laterally, as can be seen in FIG. 2. The hooks 15 and 16 have projecting ends which are directed radially inwards and which interact respectively with annular grooves 2a, 3a made in the outer cylindrical surface of the two independent inner rings 2, 3 respectively.

The cage 10 and the bush 14 are concentric and initially are an integral part of a single retention piece which is designated as a whole by 17 and part of which can be seen in FIG. 2. The part of the retention piece 17 forming a box 10 is initially attached to the piece forming a connector element 14 by means of three radial studs 18 which have a weakened portion of reduced cross-section 19, to make it easier for the pieces 10 and 14 to separate from one another as a result of the breakage of these weakened zones.

The retention piece 17 is advantageously made of plastic, to which suitable fillers are added, and is produced by moulding in a single mould which thus makes it possible to manufacture simultaneously the cage 10 and the connector element 14 initially integral with one another as a result of the connecting studs 18.

The part 20 of the connecting studs 18 which projects on the outer peripheral surface of the connector element 14 is located in a radial plane of symmetry of the element 14. On the contrary, the part 21 which is integral with the bore of the cage 10 is located in a position offset relative to the radial plane of symmetry of the box 10. It will be seen that the parting line of the mould for producing the piece 17 passes exactly through the plane of symmetry of the three connecting studs 18, thus making the production of the retention piece 17 much easier.

Moreover, the offset position of the portions 21 of the connecting studs 18 makes it possible to obtain the separation of the cage 10 and the connector element 14 very easily during the operation of assembling the bearing according to the invention.

The various steps in the assembly process will now be explained with reference to FIGS. 3 to 7.

Figure 4:
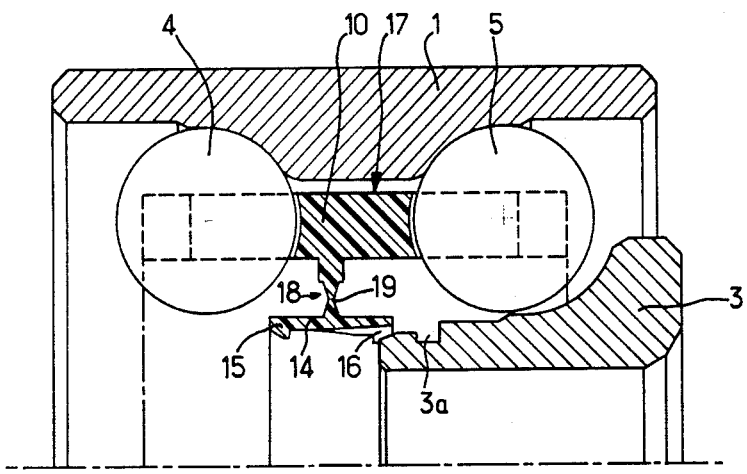
Figure 5:
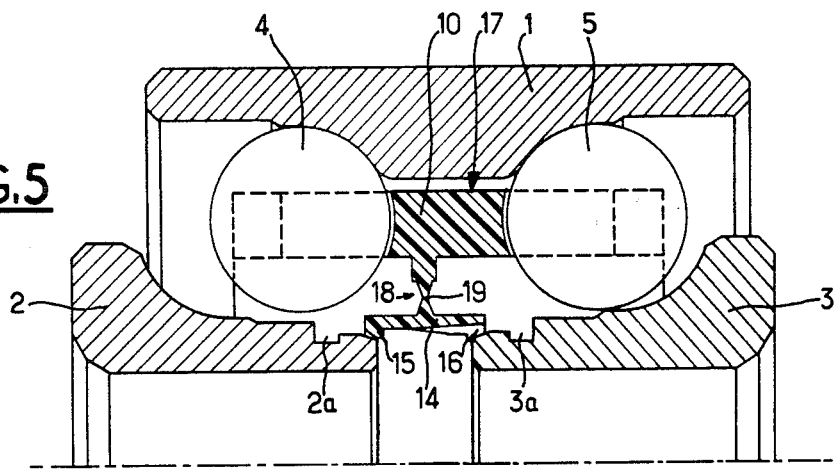
Figure 6:
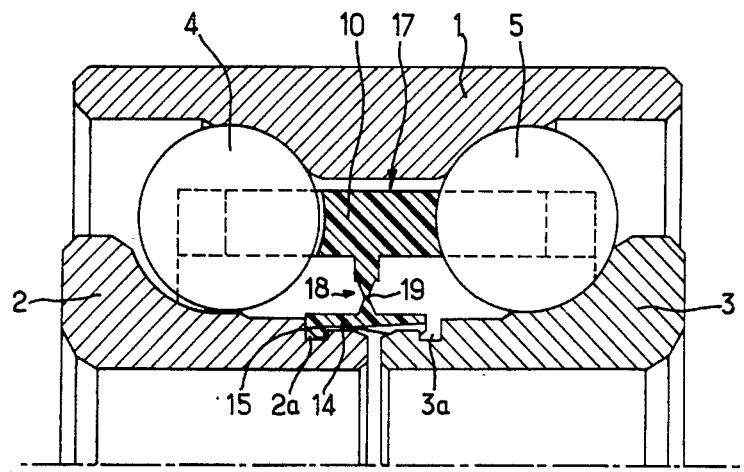

The balls 4 and 5 are introduced in succession into the pockets of the cage 10 which forms an integral part of the connector element 14, until they come in contact with the raceways of the outer ring 1. As illustrated in FIGS. 4 and 5, the two inner rings 2 and 3 are then introduced in succession, until the ends of the hooks 15 and 16 come up against the extreme edge of the two inner rings 2 and 3 (FIG. 5). An axial push is then exerted on the two inner rings 2, 3, thus first of all causing, for example, the hook 15 to penetrate into the groove 2a of the inner ring 2, as illustrated in FIG. 6. This axial push is continued (FIG. 7), thereby causing the second row of hooks 16 to penetrate into the groove 3a of the other inner ring 3.

It will be seen that the outer edge of the hook 15 comes axially up against the edge of the groove 2a, so that the axial push causes the three connecting studs 18 to break because of the offset position of the part 21 connected to the box 10.

Figure 7:
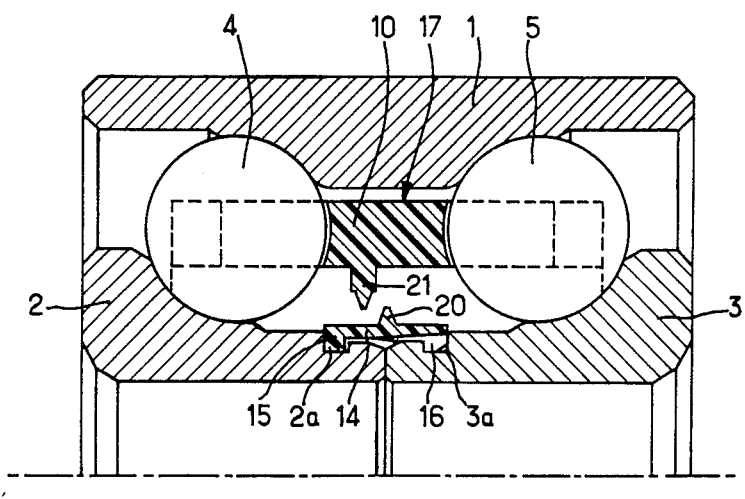

The final position shown in FIG. 7 corresponds to that of FIG. 1. In this position, it can be seen that the two inner rings 2, 3 are retained axially by the connector element 14 and particularly by means of the two rows of hooks 15, 16 which, after snapping elastically into the two grooves 2a, 3a, cannot come out of these and therefore keep the two inner rings 2, 3 fixed axially to one another.

Figure 8:
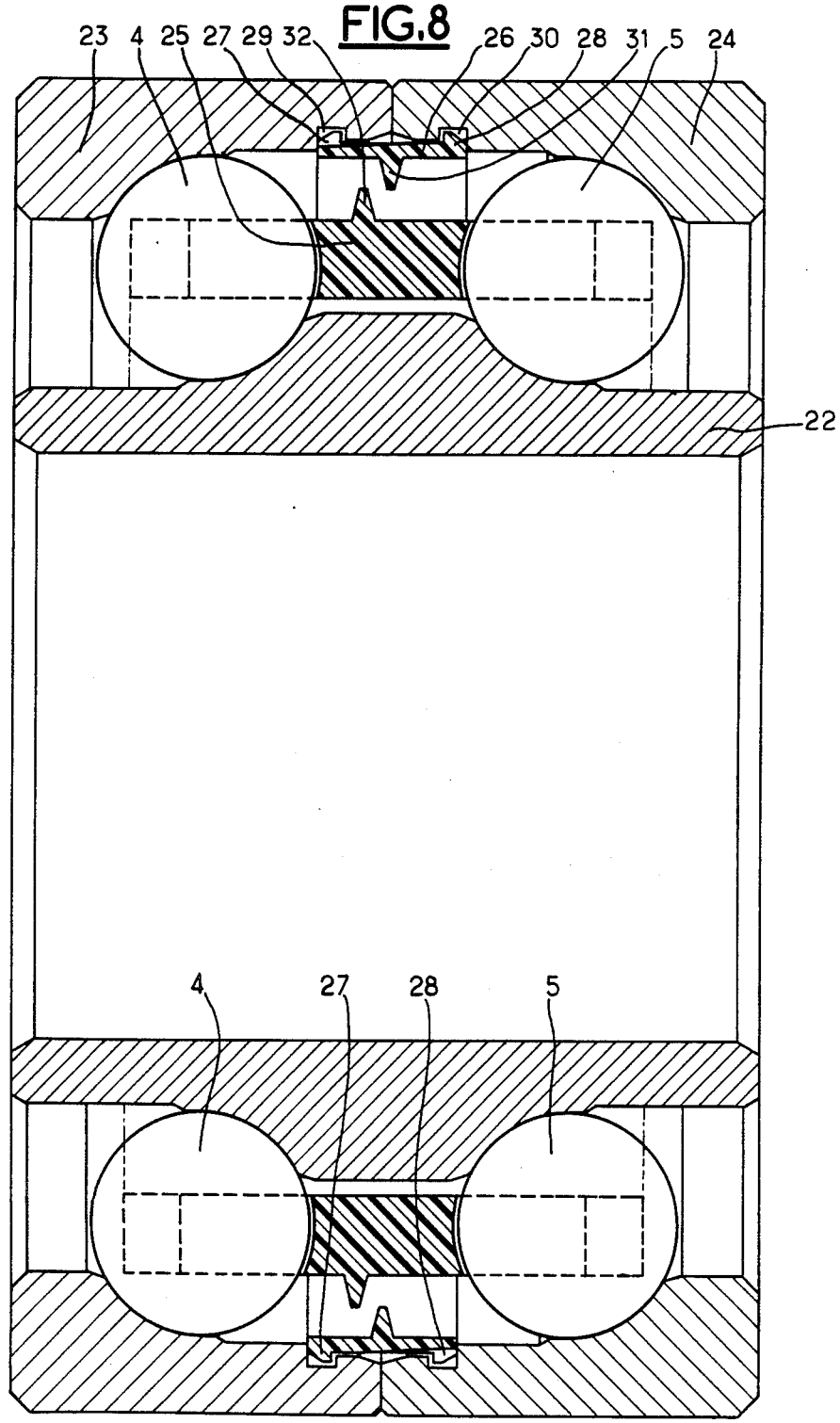
FIG. 8 is a sectional view, similar to that of FIG. 1, of an alternative rolling bearing according to the invention.

Although, in the embodiment just described, the independent rings were the two inner rings 2, 3, it will be appreciated that this arrangement can be reversed, as illustrated by the alternative form shown in FIG. 8.

In this alternative form, in which identical components bear the same reference numerals, the ring in one piece is the inner ring 22, whilst the two independent rings 23, 24 form the outer rings. The retention piece consists of a part forming a cage 25 and a part in the form of a cylindrical connector element 26 arranged concentrically relative to the cage 25 and on the outside of the latter, contrary to the embodiment of the preceding FIGS., in which the connector element 14 was arranged concentrically on the inside of the cage 10.

The connector element 26, like the element 14, has hooks 27, 28 interacting with grooves 29, 30 made in the outer rings 23, 24 respectively, to ensure that the latter are fixed to one another. The connector element 26 and the cage 25 are initially two parts of one and the same piece which are connected together by means of three studs, each comprising a part 31 connected to the element 26 in its radial plane of symmetry and a part 32 connected to the cage 25 in a position offset relative to its radial plane of symmetry. As before, the connecting studs are broken during the assembly of the bearing with two rows of angular-contact balls.

Figure 9:
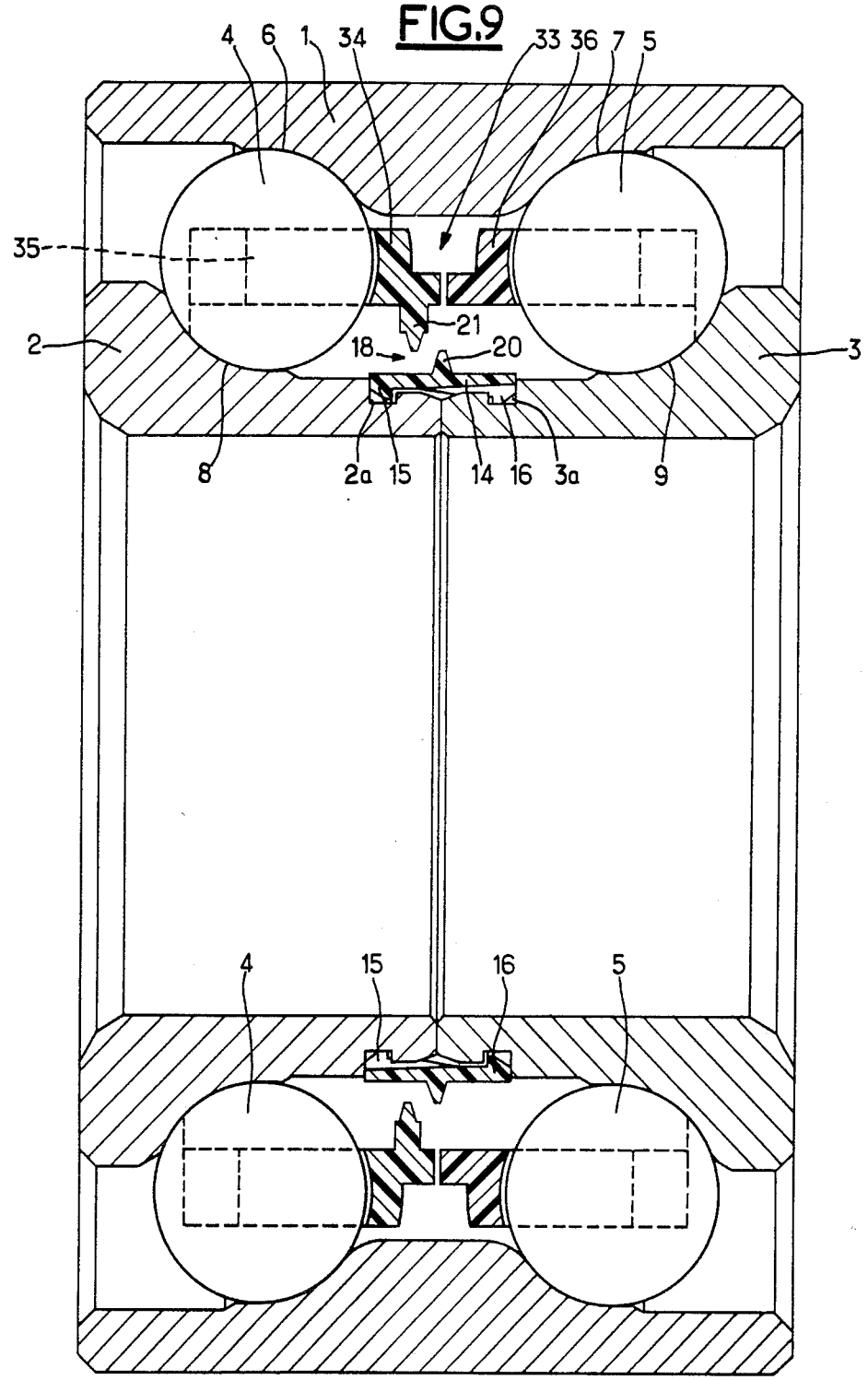
FIG. 9 is a similar sectional view of another alternative rolling bearing according to the invention.

In the alternative form illustrated in FIG. 9, once again there is a bearing with two rows of angular-contact balls, which is similar to that illustrated in FIG. 1. Identical components bear the same reference numerals.

Here once more are, in particular, the outer ring in one piece 1 and the two independent inner rings 2, 3 having the same outer grooves 2a, 3a.

Figure 10:
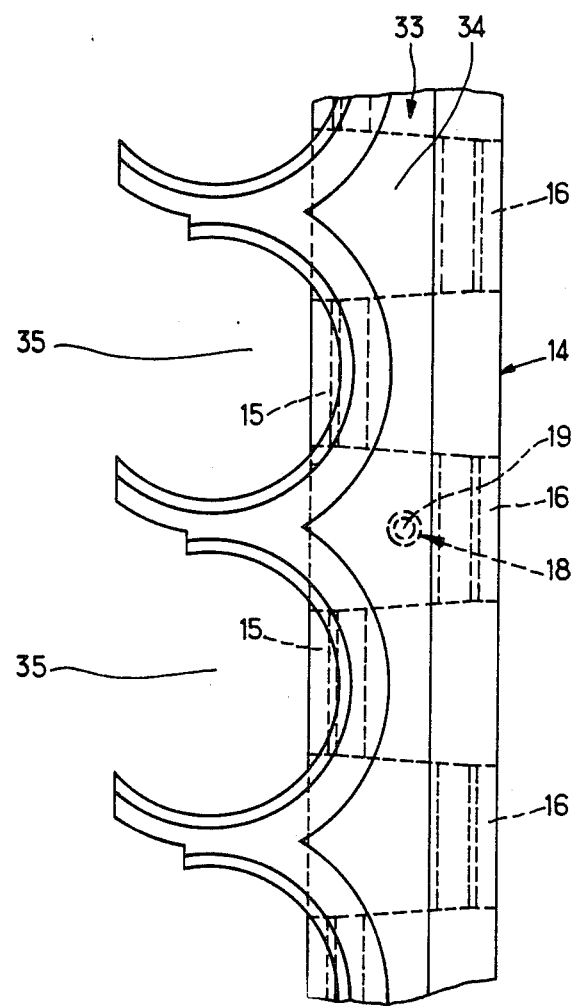
FIG. 10 is a partial laid-out view of a retention piece used in the rolling bearing of FIG. 9.

The difference in this alternative form is that a retention piece of different structure, which can be seen laid out in FIG. 10 and which is designated as a whole by 33, is used.

The retention piece 33 has a connector element 14 identical to the preceding one and a part forming a cage 34 provided with a single lateral row of pockets 35 interacting with one of the rows of balls 4. The connection between the element 14 equipped with its hooks 15 and 16 and the cage 34 is made, as before, by means of three connecting studs 18. As before, the portion 20 of the studs 18 which is integral with the element 14 is in the radial plane of symmetry of the connector element 14. The position of the parts 21 on the bore of the cage 14 is offset relative to the radial axis of symmetry of the bearing as a whole after assembly, as can be seen particularly in FIG. 9, thus, as before, causing the weakened connection to break during the assembly of the bearing. The second row of balls 5 interacts with a separate cage 36 which is capable of coming up against the cage 34 during assembly.

Figure 11:
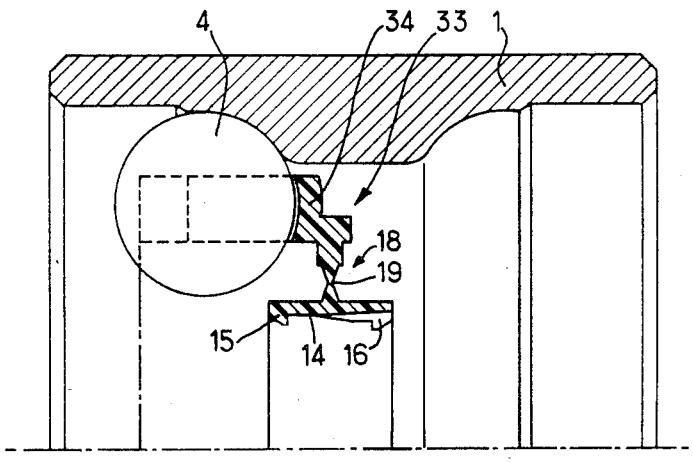
FIGS. 11 to 17 illustrate the various steps in the assembly of the rolling bearing of FIG. 9.
Figure 12:
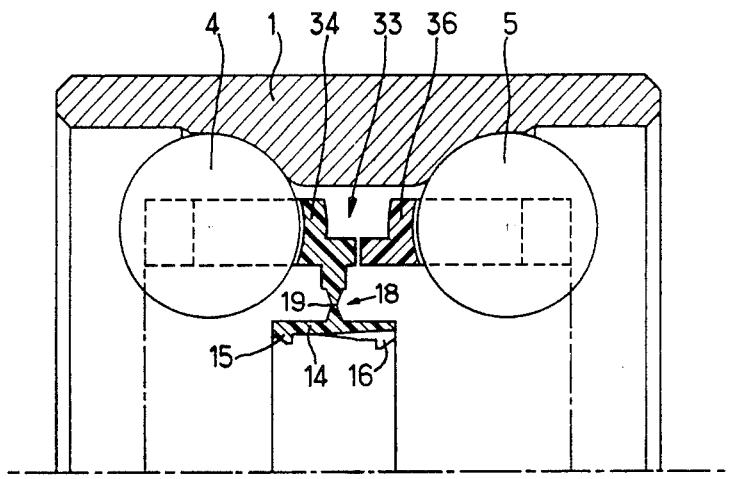
Figure 13:
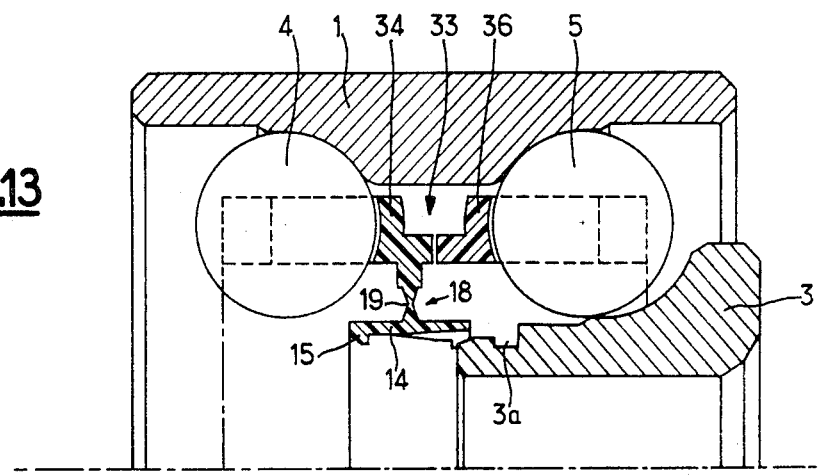
Figure 14:
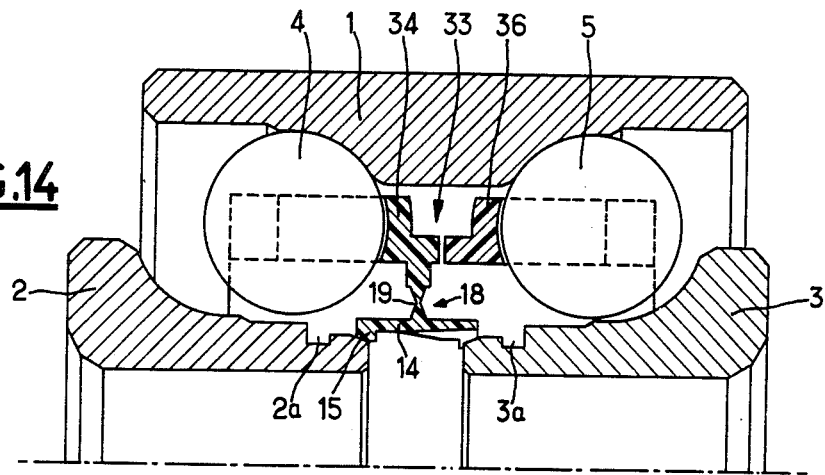
Figure 15:
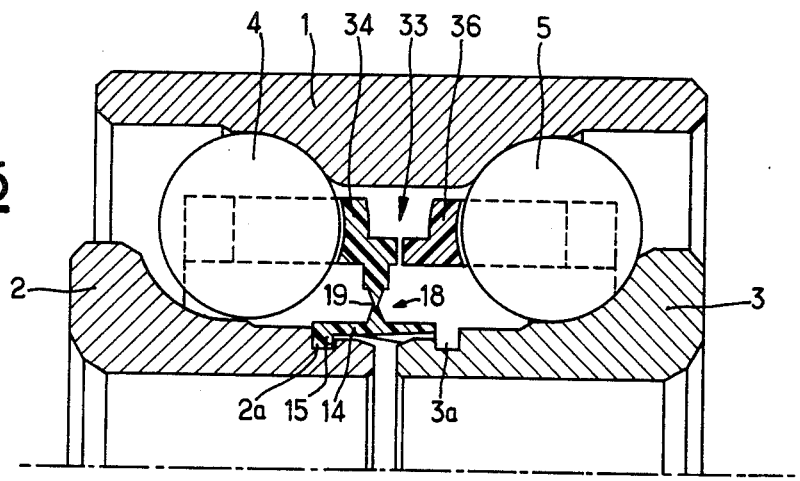
Figure 16:
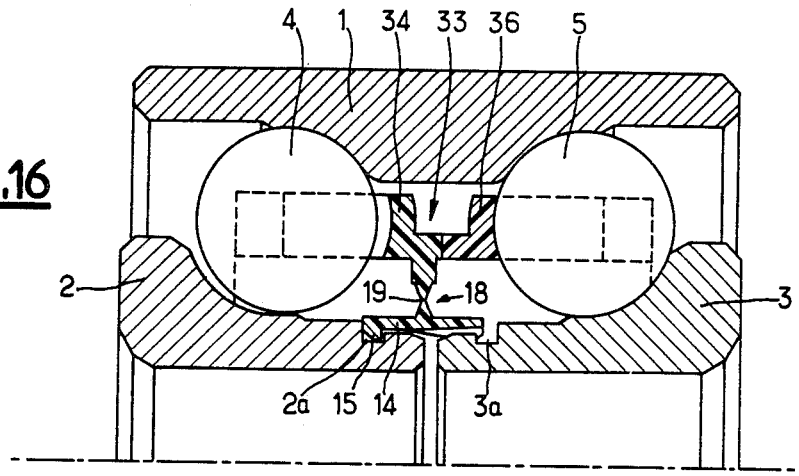
Figure 17:
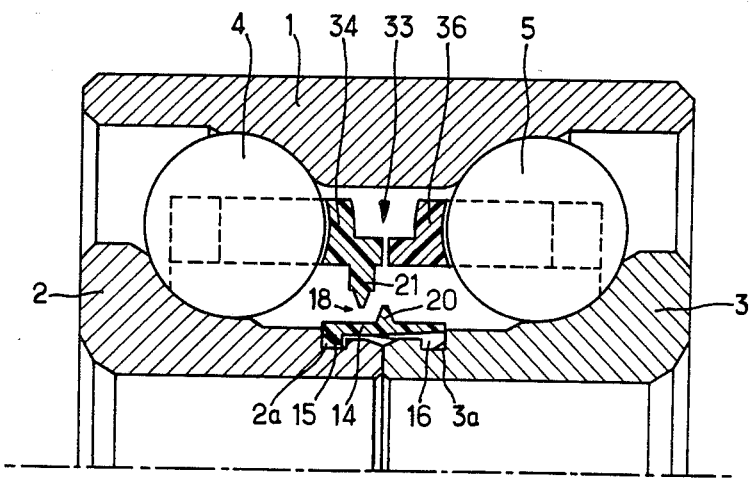

The various assembly steps are illustrated in FIGS. 11 to 17. The first row of balls 4 introduced into the pockets 35 of the cage 34 of the retention piece 33 is first mounted in the bore of the outer ring 1, as illustrated in FIG. 11. The second row of balls 5, together with their separate cage 36, is subsequently introduced (FIG. 12). The two independent inner rings 2, 3 are then introduced in succession, as illustrated in FIGS. 13 and 14, until the hooks 15 and 16 come up against the outside edges of the inner rings, 2, 3 (FIG. 14). An axial push is then exerted on the two inner rings 2, 3 until the row of hooks 15 located on the same side as the cage 34 penetrates into the groove 2a of the inner ring 2, as illustrated in FIG. 15. The continuation of the axial push illustrated in FIG. 16 causes stop contact between the cage 34 forming part of the retention piece 33 and the separate cage 36 (FIG. 16). The second row of hooks 16 then penetrates into the groove 3a by snapping elastically into it, at the same time as the element 14 and the cage 34 separate as a result of the breakage of the three connecting studs 18 weakened in their zone 19. This final position of FIG. 17 corresponds to that of FIG. 9. In this position, the two inner rings 23 are retained axially by means of the two rows of hooks 15 and 16 of the element 14.

Although in this embodiment, as in FIG. 1, the invention has once again been illustrated in terms of a ball bearing with two rows of angular-contact balls, comprising an outer ring in one piece and two independent inner rings, it will be appreciated that the same alternative form could be used, without any substantial change, when it is the inner ring which is in one piece, as illustrated in FIG. 8.

The alternative form just described, in which the bearing cage is in two parts, can be advantageous when the two rows of rolling elements have to be further apart from one another than in the embodiment illustrated in FIG. 1.

Figure 18:
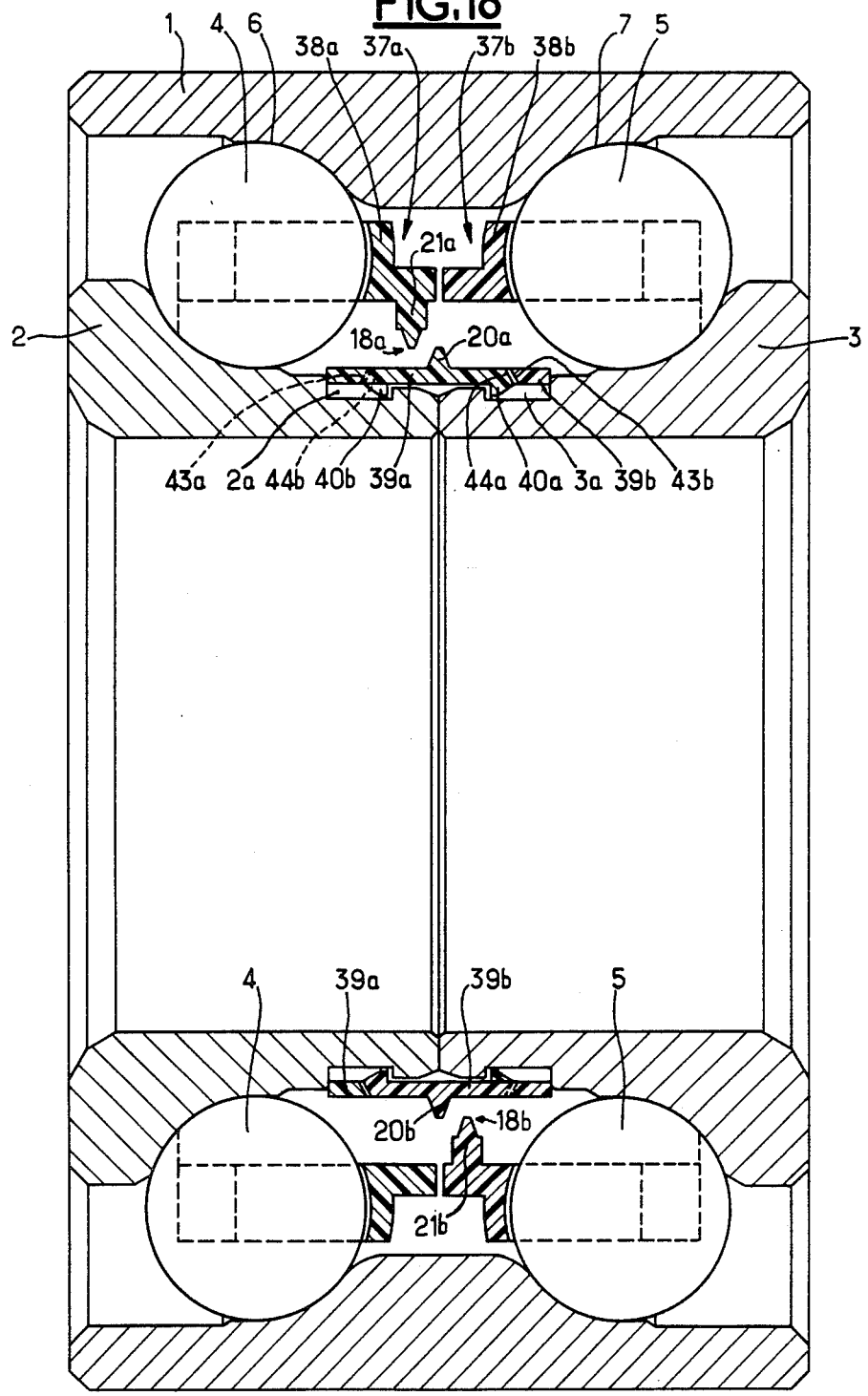
FIG. 18 is a sectional view, similar to that of FIG. 2, of another alternative rolling bearing according to the invention, using two identical retention pieces.

The alternative form shown in FIG. 18 can also be used for a situation of this type.

This alternative form is illustrated by a ball bearing with two rows of angular-contact balls, comprising, as in FIG. 1, a single outer ring 1 and two independent inner rings 2, 3. In FIG. 18 and the following FIGS., the components identical to those of the preceding embodiments bear the same reference numerals.

Figure 19:
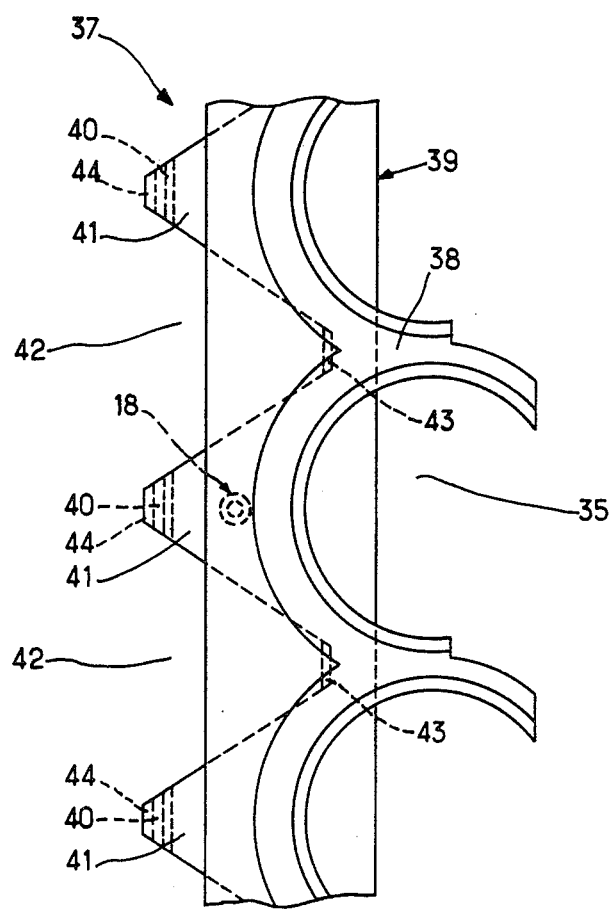
FIG. 19 is a partial laid-out view of one of the retention pieces used in the rolling bearing of FIG. 18.

In this embodiment, two identical retention pieces are used, and of these one 37 is partially shown laid out in FIG. 19. Each retention piece 37 has a part 38 forming a cage, having a plurality of pockets 35 intended for receiving the balls of one of the rows of balls of the bearing. The retention piece also has a bush-shaped part 39 equipped with a plurality of hooks 40, the ends of which project radially inwards. The part 39 is concentric relative to the box 38 and here is arranged on the inside of the box 38. The hooks 40 are arranged at the end of axial tongues 41 separated by matching recesses 42. The part 39 is thus composed, in the form of sawteeth, of a series of substantially triangular tongues 41 separated by recesses of identical shape and size. The hooks 40 are located at the end of the tongues 41, that is to say opposite the pockets 35 of the cage 38. The bottom 43 of each recess 42 is sloping relative to a radial plane. In the same way, the end of the hooks 40 has a sloping surface 44, the slope of which matches that of the sloping surface 43. The connection between the cage 38 and the cage 39 is made by three studs 18 integral with a tongue 41 of the part 39 by means of a portion 20 and with the cage 38 by means of a portion 21.

In this embodiment, the two retention pieces 37, which are identical, can therefore be produced by moulding from a single mould, and the two pieces 37 can subsequently be fitted into one another because of their matching shapes.

In FIGS. 18 and 20 to 26, the various elements of the retention piece 37 interacting with the first row of balls 4 will be given the index a, whilst all the elements of the other retention piece 37 interacting with the second row of balls 5 will be given the reference b.

After assembly, as illustrated in FIG. 18, the independent inner rings 2, 3 are fixed axially together by means of the two parts 39a and 39b fitted into one another. In particular, the hooks 40a penetrate into the groove 3a of the inner ring 3 which interacts with the second row of balls 5. In the same way, the hooks 40b of the part 39b have penetrated into the groove 2a of the inner ring 2 which interacts with the first row of balls 4. The sloping surfaces 43b interact with the sloping surfaces 44a inside the groove 3a, whilst the sloping surfaces 43a interact with the sloping surfaces 44b in the groove 2a.

In the sectional plane which can be seen in the upper part of FIG. 18, the parts 20a and 21a of the connecting studs 18a connecting the half-box 38a to the half-bush 39a are shown, the said connecting studs having been broken at the moment when the bearing is assembled. On the contrary, the lower part of FIG. 18 shows, in another sectional plane, the parts 20b and 21b of the studs 18b which connect the half-bush 39b to the half-cage 38b. In both cases, it will be seen that the portions 20a and 20b of the connecting studs 18a, 18b are arranged so that, after the assembly of the bearing, they are in the radial plane of symmetry of the latter and in the radial plane of symmetry of the bush a connector element formed by joining together the two half-bushes 38a, 38b. On the contrary, the parts 21a and 21b of the connecting studs 18a and 18b are offset relative to the same radial plane of symmetry, in order, as before, to make it possible for the connecting studs 18a, 18b to break when the bearing is assembled.

The various assembly steps are illustrated in FIGS. 20 to 26.

Figure 20:
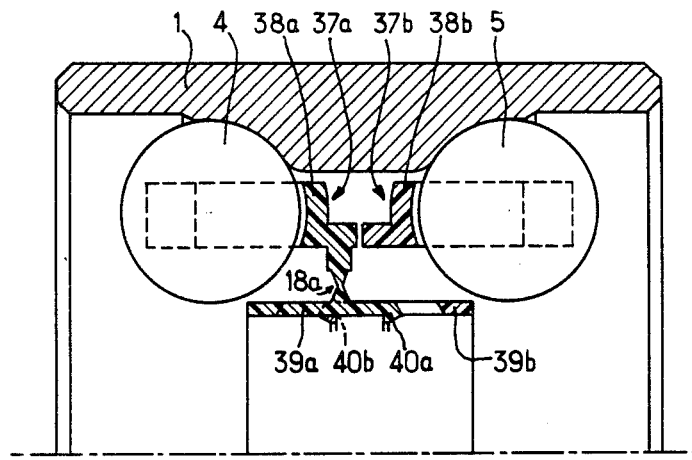
Figure 21:
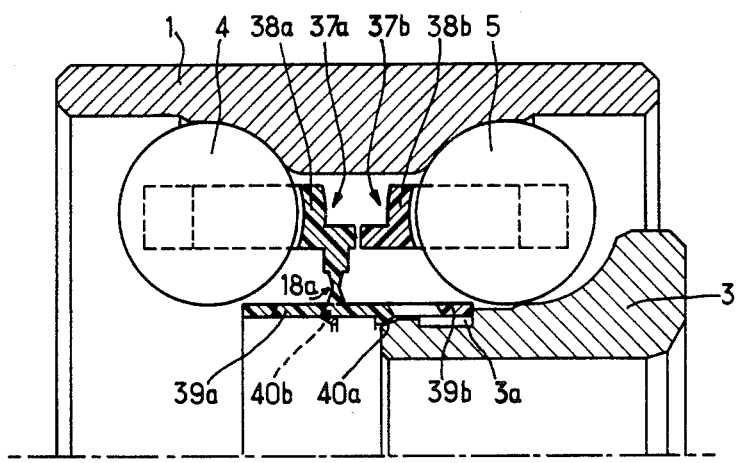
Figure 22:
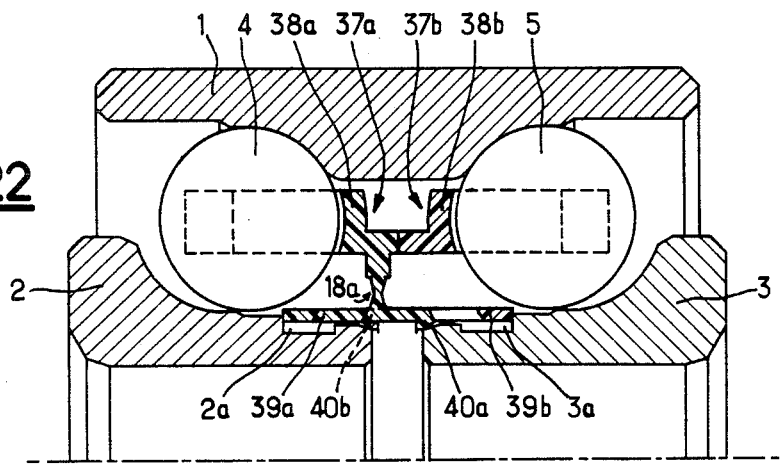
Figure 23:
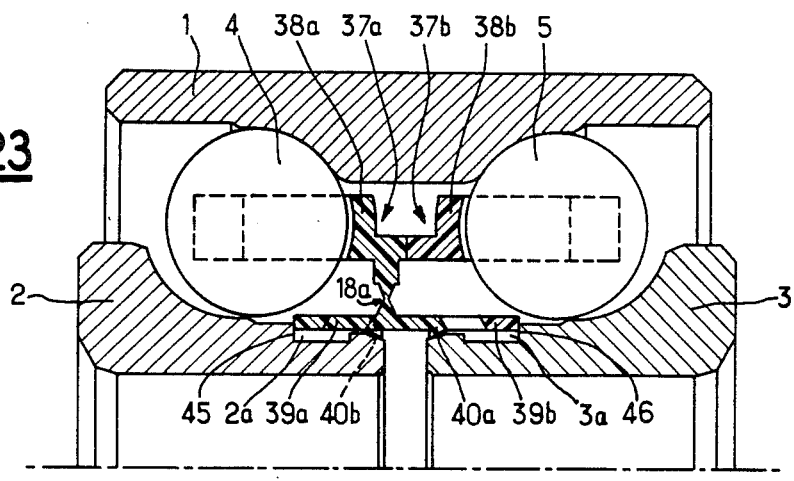

As illustrated in FIG. 20, the two separate assemblies consisting respectively of the first row of balls 4 mounted in the first retention piece 37a and the second row of balls 5 mounted in the second retention piece 37b are first introduced into the outer ring 1. The two independent inner rings 2, 3 are subsequently fitted in succession, as illustrated in FIGS. 21 and 22, until the rings 2, 3 come in contact via their outer edge with the respective hooks 40a and 40b of the two retention pieces 37a, 37b. An axial push is exerted on the two inner rings 2, 3, as illustrated in FIG. 23, the two cages 37a, 37b coming up against one another. In the same way, the bottom surfaces of the two half-bushes 39a, 39b come up against shoulders 45 and 46 of the grooves 2a, 2b. Until this moment, the connecting studs 18a, 18b remain intact, the two parts of each of the retention pieces 37a, 37b remaining integral with one another. It will be seen that, because of the choice of sectional plane, FIGS. 20 to 23 only show the connecting studs 18a. It goes without saying, however, that the connecting studs 18b located outside of the sectional plane are also intact at this stage.

Figure 24:
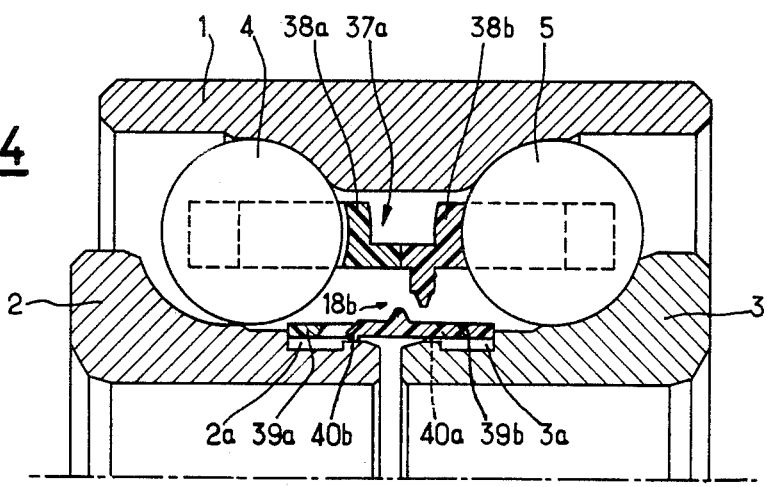
Figure 25:
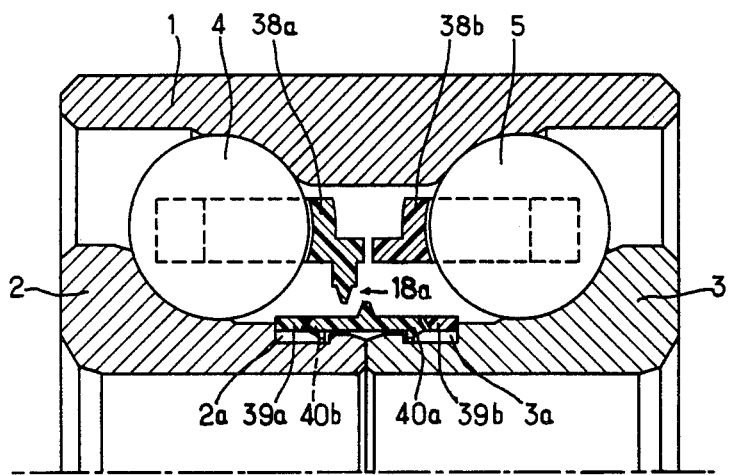

As illustrated in FIG. 24, the continuation of the axial push causes the connecting studs of one of the shows a sectional plane different from that of FIGS. 20 to 23, in order to demonstrate the breaking of the studs 18b caused as a result of the axial push mentioned above. At this stage, therefore, the retention piece 37b interacting with the second row of balls 5 is separated into a half-cage 38b and a half-bush 39b, whilst the two parts of the retention peice 37a are still joined integrally to one another by means of the connecting studs 18a. The continuation of the axial thrust illustrated in FIG. 25, which once again is a section taken in the same plane as FIGS. 20 to 23, causes the connecting studs 18a to break at the moment when the hooks 40a and 40b penetrate into their respective grooves 2a, 3a. The final position of FIG. 26 corresponds to that illustrated in FIG. 18, in which the two inner rings 2, 3 are fixed axially to one another by means of the two half-bushes 39a, 39b fitted into one another.

It will be seen from an examination of FIG. 18 that, after the hooks 40a and 40b have snapped into their respective grooves 2a, 3a, any attempt to disconnect the rings 2, 3 from one another axially is prevented by a hooking effect of the half bushes 39a, 39b reinforced by the interaction of the matching slopes of the bottom surfaces 43a, 43b with the sloping faces 44a, 44b of the hooks 40a, 40b. In fact, it can be seen in FIG. 18 that a pull aimed at moving the inner rings 2, 3 apart from one another tends to make the hooks 40a, 40b penetrate into their respective grooves 2a, 3a because of the slopes mentioned above, the effect of this being to improve the hooking effect even further.

Although the invention has mainly been illustrated in terms of ball bearings with two rows of angular-contact rolling elements, it will be understood that the invention can be modified, without particular difficulty, to be suitable for rolling bearings comprising two rows of different rows of rolling elements, such as cylinders, truncated cones, etc.

We claim:

1. A roller bearing assembly comprising two rows of rolling elements, two raceways and two independent rings, each of said independent rings having one raceway, means for maintaining the relative positions of the rolling elements between the rings and means for fixing the two independent rings axially to one another, the two independent rings being fixed axially to one another by means of two parts of a retention means having, before the bearing is assembled, one or more connecting zones weakened so that they are capable of breaking during assembly of said bearing, the retention means maintaining the relative positions of at least some of that rolling elements.

2. An assembly according to claim 1, wherein the weakened connecting zones are arranged in such a way that the axial position of the two parts of the retention means is different before and after assembly, in order to cause the said connecting zones to break during assembly.

3. An assembly according to claim 1, wherein the part of the retention means ensuring that the two independent rings are fixed axially to one another comprises a connector element equipped with radially directed hooks designed to interact with at least one groove made in one of the said independent rings.

4. An assembly according to claim 3, wherein the connector element has axial stop surfaces designed to interact with a corresponding surface of one of the independent rings, in order to cause the connecting zones to break during assembly.

5. An assembly according to claim 1, wherein the part of the retention means which ensures that the two independent rings are fixed axially to one another comprises a connector element equipped with two rows of hooks designed to interact with a groove made in one of the said independent rings.

6. An assembly according to claim 5, wherein the part of the retention means which ensures that the rolling elements are maintained in place comprises a cage provided with staggered pockets receiving the rolling elements of the two rows of rolling elements.

7. An assembly according to claim 6, wherein the two parts of the retention means are joined integrally to one another, before the bearing is assembled, by means of at least three radially connecting studs having a zone of reduced thickness.

8. An assembly according to claim 7, wherein the connecting studs are integral with the connector element in a radial plane of symmetry of the latter and integral with the cage in a position offset relative to a radial plane of symmetry of the bearing assembly.

9. An assembly according to claim 5, wherein the part of the retention means which ensures that the rolling elements are maintained in place comprises a first cage provided with pockets for receiving the rolling elements of one of the rows of rolling elements, the rolling elements of the other row being retained by a separate cage.

10. An assembly according to claim 9, wherein the two parts of the retention means are joined integrally to one another, before the bearing is assembled, by means of at least three radially connecting studs having a zone of reduced thickness.

11. An assembly according to claim 10, wherein the connecting studs are integral with the connector element in a radial plane of symmetry of the connector element and integral with the first above mentioned cage in a position offset relative to a radial plane of symmetry of the bearing assembly.

12. An assembly according claim 1, wherein the retention means has two retention pieces made substantially symmetrical relative to a radial plane of symmetry of the bearing assembly, each retention piece comprising a cage provided with pockets for receiving the rolling elements of one of the rows of rolling elements and a connector element equipped with a row of hooks capable of engaging a groove made in one of the independent rings which has the raceway for the rolling elements row.

13. An assembly according to claim 12, wherein the hooks are arranged at the end of equidistant axial tongues separated by matching recesses so that the two retention pieces can fit into one another.

14. An assembly according to claim 13, wherein the hooks of each retention piece have a sloping surface matching the bottom of the recesses of the other retention piece, in order, after assembly, to reinforce the action of the hooks because the shapes of the two matching sloping surfaces complement one another.

15. An assembly according to claim 12, comprising radially connecting studs having a zone of reduced thickness made integral with the connector element of each retention piece in a radial plane of symmetry of the bearing and integral with the cage of each retention piece in a position offset relative to a radial plane of symmetry of the bearing.

16. An assembly according to claim 12, wherein the independent rings form the inner ring of the bearing.

17. An assembly according to claim 12, wherein the two independent rings form the outer ring of the bearing.

18. An assembly according to claim 1, wherein the independent rings form the outer ring of the bearing assembly.

19. An assembly according to claim 1, wherein the two independent rings form the outer ring of the bearing assembly.

20. Retention means made of moulded plastic material, comprising a first part in the form of a cylindrical cage provided with pockets capable of receiving at least some rolling elements of a roller bearing assembly with two rows of rolling elements, said roller bearing assembly comprising a first ring formed in one piece and a set of two independent rings and a second part moulded integrally with said first part concentric relative to the cage and connected to the latter by means of one or more connecting zones weakened so that they are capable of breaking during the assembly of the bearing assembly.

21. Retention means according to claim 20, wherein the second part comprises a plurality of radially directed hooks adapted for connecting the two independent rings of the bearing assembly to one another.

22. Retention means according to claim 20, wherein the second part is connected to the cage by means of at least three radially connecting studs having a zone of reduced thickness.

23. Retention means according to claim 22, wherein the connecting studs are integral with the second part in a radial plane of symmetry of the second part and integral with the cage in a position offset relative to the radial plane of symmetry of the cage.

* * * * *

UNITED STATES PATENT AND TRADEMARK OFFICE
CERTIFICATE OF CORRECTION

PATENT NO. : 4,783,182

DATED : November 8, 1988

INVENTOR(S) : Fabrice Caron and Herve Le Quinio

It is certified that error appears in the above-identified patent and that said Letters Patent is hereby corrected as shown below:

Col. 5, line 30, "26" should be --25--.

Col. 5, line 39, "inner" should be --outer--.

Col. 5, line 40, "outer" should be --inner--.

Col. 8, line 47, "26" should be --25--.

Col. 8, line 65, "half-box" should be --half-cage--.

Col. 8, line 65, "half-bush" should be --half-part--.

Col. 9, line 2, "half-bush" should be --half-part--.

Col. 9, line 8, "half-bushes" should be --half-parts--.

Col. 9, line 15, "26" should be --25--.

Col. 9, line 54, "of Figure 26 corresponds to that" should be --is--.

Signed and Sealed this

Twenty-fifth Day of April, 1989

Attest:

DONALD J. QUIGG

Attesting Officer

Commissioner of Patents and Trademarks